(12) United States Patent
Léonard et al.

(10) Patent No.: US 9,637,003 B2
(45) Date of Patent: May 2, 2017

(54) PROTECTED SYSTEM FOR CONTROLLING POWER TRANSACTIONS FOR AN ELECTRIC VEHICLE

(71) Applicant: HYDRO-QUÉBEC, Montréal (CA)

(72) Inventors: François Léonard, Montréal (CA); Dominique Champagne, Mont-Saint-Hilaire (CA); Jacques Bherer, Saint-Jean-sur-Richelieu (CA); Daniel Pineau, Verchères (CA)

(73) Assignee: HYDRO-QUÉBEC, Montréal, Québec ( * ) Notice: Subject to any disclaimer, the term of this patent is extended or adjusted under 35 U.S.C. 154(b) by 238 days.

(21) Appl. No.: 14/374,262

(22) PCT Filed: Jan. 29, 2013

(86) PCT No.: PCT/CA2013/050063
§ 371 (c)(1),
(2) Date: Jul. 24, 2014

(87) PCT Pub. No.: WO2013/113112
PCT Pub. Date: Aug. 8, 2013

(65) Prior Publication Data
US 2014/0365065 A1 Dec. 11, 2014

(30) Foreign Application Priority Data

Jan. 30, 2012 (CA) ..................... 2765945

(51) Int. Cl.
| | |
|---|---|
| *G01M 17/00* | (2006.01) |
| *G06F 7/00* | (2006.01) |
| *G06F 11/30* | (2006.01) |
| *G07C 5/00* | (2006.01) |
| *G06F 19/00* | (2011.01) |
| *B60L 3/12* | (2006.01) |

(Continued)

(52) U.S. Cl.
CPC ............ *B60L 3/12* (2013.01); *B60L 11/1805* (2013.01); *B60L 11/1842* (2013.01);
(Continued)

(58) Field of Classification Search
CPC ............ B60L 11/1805; B60L 11/1842; B60L 11/1846; B60L 11/1851; B60L 11/1861;
(Continued)

(56) References Cited

U.S. PATENT DOCUMENTS 5,349,535 A 9/1994 Gupta
5,701,068 A 12/1997 Baer et al.
(Continued)

FOREIGN PATENT DOCUMENTS

CN 1949559 A1 4/2007
CN 101318489 A 12/2008
(Continued)

*Primary Examiner* — Harry Oh
(74) *Attorney, Agent, or Firm* — Muirhead and Saturnelli, LLC

(57) ABSTRACT

The invention concerns a protected system for controlling power transactions for an electric vehicle. Identification modules are incorporated into the vehicle battery management system and box, and integrity sensors of the box and of the battery are connected to a monitoring module. The system comprises a processing module for processing information produced by the battery management system, the vehicle management unit, the integrity monitoring module, and an identification module for identifying devices connected to a bus between the devices. A memory stores data indicative of technical characteristics of the battery, and data concerning events, transactions and energy depending on the information received. A calculation unit determines an energy balance according to the event, transaction and energy data. A communication module transmits a warning in case of an imbalance in the energy balance and a breach in integrity revealed by the data.

20 Claims, 1 Drawing Sheet

(51) Int. Cl.
  *B60L 11/18* (2006.01)
  *H02J 7/00* (2006.01)
  *H02J 7/02* (2016.01)
  *H01M 10/42* (2006.01)

(52) U.S. Cl.
  CPC ....... *B60L 11/1844* (2013.01); *B60L 11/1846* (2013.01); *B60L 11/1851* (2013.01); *B60L 11/1861* (2013.01); *B60L 11/1864* (2013.01); *H02J 7/0029* (2013.01); *H02J 7/0047* (2013.01); *H02J 7/0055* (2013.01); *H02J 7/027* (2013.01); *B60L 2210/30* (2013.01); *B60L 2210/40* (2013.01); *B60L 2230/16* (2013.01); *B60L 2240/54* (2013.01); *B60L 2240/545* (2013.01); *B60L 2240/547* (2013.01); *B60L 2240/549* (2013.01); *B60L 2250/10* (2013.01); *B60L 2250/20* (2013.01); *H01M 10/4221* (2013.01); *H01M 2010/4271* (2013.01); *H01M 2220/20* (2013.01); *H02J 2007/0001* (2013.01); *H02J 2007/0098* (2013.01); *Y02E 60/721* (2013.01); *Y02T 10/7005* (2013.01); *Y02T 10/7044* (2013.01); *Y02T 10/7061* (2013.01); *Y02T 10/7088* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(58) Field of Classification Search
  CPC ......... B60L 2240/547; B60L 2240/549; B60L 3/12; Y02T 10/7005; Y02T 10/7044; Y02T 10/7072; Y02T 90/14; Y02T 90/16; Y02T 90/163; Y02T 90/169; Y04S 30/14
  USPC ........................................................ 701/29.6
  See application file for complete search history.

(56) References Cited

U.S. PATENT DOCUMENTS

| | | | |
|---|---|---|---|
| 6,507,169 B1* | 1/2003 | Holtom | B60L 3/0046 320/106 |
| 7,139,839 B2 | 11/2006 | White et al. | |
| 8,536,826 B2 | 9/2013 | Matsuoka et al. | |
| 2003/0101282 A1 | 5/2003 | White et al. | |
| 2005/0285445 A1 | 12/2005 | Wruck et al. | |
| 2007/0080662 A1 | 4/2007 | Wu | |
| 2009/0278492 A1 | 11/2009 | Shimizu et al. | |
| 2010/0049533 A1 | 2/2010 | Ferro et al. | |
| 2010/0121511 A1 | 5/2010 | Onnerud et al. | |
| 2010/0194529 A1 | 8/2010 | Yamamoto | |
| 2010/0306533 A1* | 12/2010 | Phatak | G06F 21/34 713/156 |
| 2011/0078092 A1* | 3/2011 | Kim | B60L 11/1824 705/412 |
| 2011/0202418 A1 | 8/2011 | Kempton et al. | |
| 2011/0213983 A1 | 9/2011 | Staugaitis et al. | |
| 2011/0257835 A1 | 10/2011 | Larschan et al. | |
| 2012/0025842 A1* | 2/2012 | Gibbs | G01R 31/045 324/538 |
| 2012/0053742 A1* | 3/2012 | Tsuda | B60L 11/1842 700/291 |
| 2012/0078444 A1* | 3/2012 | Mase | G06F 21/88 701/2 |
| 2012/0274287 A1* | 11/2012 | Ree | B60L 3/0046 320/162 |
| 2013/0164572 A1* | 6/2013 | Liao | H01M 10/4221 429/50 |

FOREIGN PATENT DOCUMENTS

| | | |
|---|---|---|
| CN | 201876720 U | 6/2011 |
| CN | 102129646 A | 7/2011 |
| CN | 102164773 A | 8/2011 |
| CN | 202004115 U | 10/2011 |
| CN | 102025500 B | 3/2016 |
| DE | 698 37 816 T2 | 1/2008 |
| EP | 2 295 282 A2 | 3/2011 |
| JP | 2011-65752 A | 3/2011 |
| JP | 2011-120359 A | 6/2011 |
| JP | 2011-193592 A | 9/2011 |
| WO | WO 00/42689 | 7/2000 |
| WO | WO 2004/064222 A2 | 7/2004 |
| WO | WO 2010/033517 A2 | 3/2010 |
| WO | WO 2010/134853 A1 | 11/2010 |
| WO | WO 2011/067655 A2 | 6/2011 |
| WO | WO 2011/129668 A2 | 10/2011 |

* cited by examiner

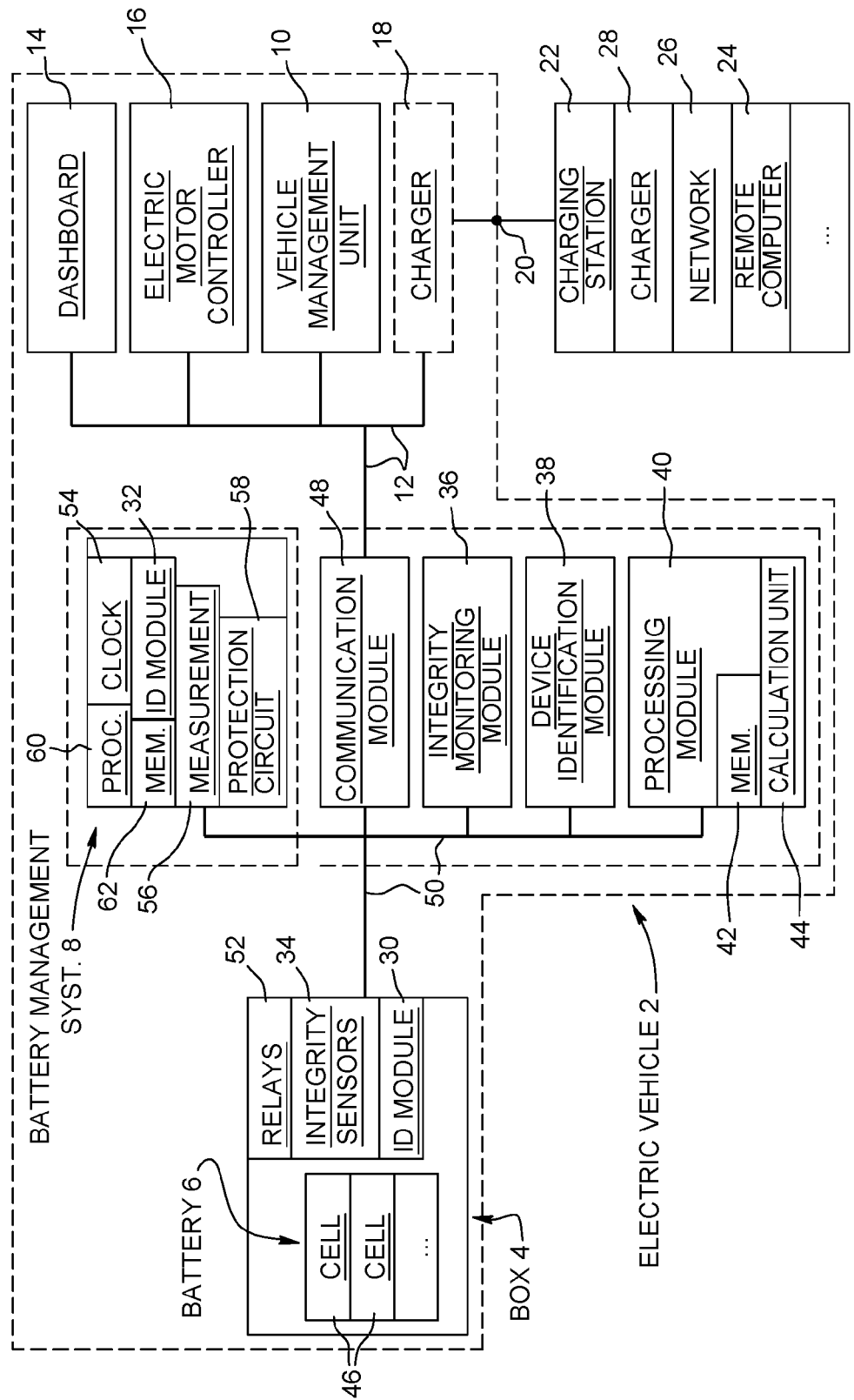

PROTECTED SYSTEM FOR CONTROLLING POWER TRANSACTIONS FOR AN ELECTRIC VEHICLE

FIELD OF THE INVENTION

The invention relates to battery management systems of electric vehicles. More particularly, the invention relates to a protected system for controlling power transactions with a battery management system of an electric vehicle, allowing especially monitoring the integrity of the energy system of the electric vehicle and detecting a situation of energy theft.

BACKGROUND

The transition from non-renewable energies to renewable energies will impact on the taxation of these energies. The use of electric vehicles in the medium term by a larger population will cause a recurring problem of energy theft for the electricity companies. For the user, this will involve the insurance that the data regarding the state of health of the battery, the battery itself, its box and its management system have integrity and have not been tampered with.

An electric vehicle has a battery management system ("BMS"). The function of the BMS is usually to protect the cells of the battery, to control them, to monitor the state of the battery and estimate its state of charge, to maximize its performances as well as to exchange with various components or devices of the system in which it evolves. It thus allows, for example, generating the information required for the display of the state of charge on the dashboard of the electric vehicle.

The BMS manages the discharge, the parameters of the charge and the safe use of the battery by estimating its state through measurement means and algorithms. By controlling its operating range, its environment and by balancing the charge of the battery, the BMS protects the battery and optimizes its performances and durability.

The battery of the vehicle may be used for purposes other than for the operation of the electric vehicle. Indeed, the battery may discharge into an electrical network when its charge is completed but before it is made available to the vehicle. In that case, the mass effect of a large amount of batteries has a stabilizing effect on the electrical network. This configuration is called V2G ("Vehicle to Grid"). There is also the V2H ("Vehicle to Home") where the battery may provide or receive power from an electrical supply panel of a house, for example during a network power failure. Finally, the battery may discharge into another load (e.g. another battery) connected to the vehicle. It is then V2L ("Vehicle to Load"). The electric vehicle must have a bidirectional charger rather than a unidirectional one in some of these configurations.

The alternating current (AC) charging stations have no integrated charger. This is not the case for direct current quick charging stations that are provided with a charger in order to control the charging voltage and current. This type of station uses a communication protocol for the exchanges with the BMS regarding the parameters of the charging. Some charging stations integrate additional functionalities: energy counter, payment system, internet access depending on whether it is a private or public access charging station. The power consumption required for the charging is available through a communication link with this type of station.

In its tasks, the BMS performs temperature, current and voltage measurements. Furthermore, the BMS keeps the history of these measurements. Depending on the configuration of the battery, these measurements extend to the different cells or cell packs of the battery. The energy available at all times is computed from these measurements and made available to the vehicle management central unit. The BMS may quantify and record the power transactions. The histories are used by the algorithms of the BMS and may also be transmitted outside the BMS.

Although there is a wide variety of BMS, there is an interest in that a BMS be able to indicate a situation of energy theft and substitution of the elements of the battery, box and BMS combination to falsify the pedigree of the system.

SUMMARY

An object of the invention is to propose a protected system for controlling power transactions with a battery management system of an electric vehicle, which allows monitoring the integrity of the energy system of the electric vehicle, in particular the battery, its box and the battery management system, and detecting a situation of energy theft.

Another object of the invention is to propose such a protected system that may communicate and identify other equipments, for example a charging station of a public power network and/or a bidirectional charger, in addition to other components of the electric vehicle.

Another object of the invention is to propose such a protected system that may record the power transactions (charging/discharging).

Another object of the invention is to propose such a protected system that may report to the user and/or to the electricity company that the physical and/or software integrity of the battery and of its BMS is breached.

According to an aspect of the invention, there is provided a protected system for controlling power transactions for an electric vehicle provided with a box enclosing a battery, a battery management system, a vehicle management unit, and a bus between the vehicle management unit and the battery management system, the protected system comprising:
  identification modules respectively integrated to the box and the battery management system, providing identification information of the box and the battery management system;
  a set of integrity sensors of the box and of the battery having readable states;
  an integrity monitoring module connected to the integrity sensors, producing information indicative of the states of the integrity sensors;
  a device identification module for identification of devices connected to the bus;
  a processing module for processing information produced by the battery management system, the vehicle management unit, the integrity monitoring module, the device identification module and other given devices when connected to the bus, the processing module having:
    a memory storing data indicative of technical characteristics of the battery, and event, transaction and energy data deriving from preestablished selective processings of the information received as function of the technical characteristics of the battery; and
    a calculation unit determining an energy balance as function of the event, transaction and energy data; and
  a communication module having a mode of transmission of a warning in case of an imbalance in the energy balance and in case of an integrity breach revealed by the data stored in the memory of the processing module.

BRIEF DESCRIPTION OF THE DRAWINGS

FIG. 1 is a schematic diagram of a protected system for controlling power transactions for an electric vehicle, according to the invention.

DETAILED DESCRIPTION OF THE PREFERRED EMBODIMENTS

Referring to FIG. 1, there is shown a protected system for controlling power transactions for an electric vehicle 2, according to the invention. The electric vehicle 2 is provided with a box 4 containing a battery 6, a battery management system 8, a vehicle management unit 10, and a bus 12 between the vehicle management unit 10 and the battery management system 8. The electric vehicle 2 has other components or devices for its use and its operation, like a dashboard 14 and an electric motor controller 16 connected to the bus 12. The electric vehicle 2 may also be provided with a charger 18 coupled between the bus 12 and an external connection element 20 allowing connecting the electric vehicle 2 to a charging station 22 or another device like a computer 24, a link with the power network 26 or another power source, or an external charger 28 if the electric vehicle 2 integrates no charger.

The protected system has identification modules that may advantageously be formed of chips 30, 32 respectively integrated to the box 4 and the battery management system 8, providing identification information of the box 4 and the battery management system 8. Other identification means may be used instead of chips if desired.

The protected system also has a set of integrity sensors 34 of the box 4 and the battery 6 that have readable states, i.e. whose states may be known by means of state signals produced by the sensors 34 or other control mechanisms. An integrity monitoring module 36 is connected to the integrity sensors 34 and produces information indicative of the states of the sensors 34.

The protected system further has a device identification module 38 for identifying devices connected to the bus 12, and a processing module 40 for processing information produced by the battery management system 8, the vehicle management unit 10, the integrity monitoring module 36, the device identification module 38 and other given devices when connected to the bus 12.

The processing module 40 has a memory 42 and a calculation unit 44. The memory 42 stores data indicative of technical characteristics of the battery 6, and event, transaction and energy data deriving from preestablished selective processings (described hereinafter) of the information received as function of the technical characteristics of the battery 6. The technical characteristics are used to define electric and thermal operating conditions of the battery 6. Typically but non-restrictively, the technical characteristics of the battery 6 relate to a type of chemistry, a number of cells 46 that it packs, a configuration of the cells 46, a nominal capacity, a nominal power, a voltage range, a maximum charge voltage of a cell 46, a minimum voltage of a cell 46, peak values of current in continuous and in power demand modes, a maximum rate of self-discharge per cell 46, a mode of equalization and charge and discharge temperature ranges. The calculation unit 44 determines an energy balance as function of the event, transaction and energy data stored in the memory 42.

The protected system also has a communication module 48 having a mode of transmission of a warning in case of an imbalance in the energy balance and in case of an integrity breach revealed by the data stored in the memory 42 of the processing module 40. The communication module 48 may also be used as an interface between the bus 12 and a bus 50 connecting the battery management system 8 with the modules 36, 38, 40, the battery 6 and other components like the sensors 34, the identification chip 30 and relays 52 for control and protection of the battery 6. The communication module 48 may have one or several communication ports of CAN bus type ("Controller Area network" bus) or other types, whose physical support may vary such as wireless, Ethernet, etc., intended to communicate with the devices connected to the bus 12, 50 that may be configured as series networks or otherwise, e.g. electric conductors or separate cables. The communication module 48 may thus communicate with the vehicle management unit 10, the charger 18, the charging station 22, the electric motor controller 16, the dashboard 14 of the vehicle 2. The communication module 48 also allows communicating with a remote computer 24 with access control that can be used to receive public data and private data, encrypted or not.

The device identification module 38 may be configured to recognize the origin of the communication link for example among its communication ports and have an identification mode for identifying a device connected to the bus 12, allowing for example identifying a charging station 22 provided with a MAC address (Media Access Control or commonly Ethernet address) or its equivalent, for example GPS coordinates (Global Positioning System) and IP address (Internet Protocol). This information may be part of the transaction data.

The event, transaction and energy data may be stored in the form of respective tables or another organized structure of information in order to determine and identify an imbalance situation or an unauthorized access attempt to the data and the material of the system. The transaction table may be used to store identifiers of components where power has been transacted with, as well as power measurements reported by those components via the communication module 48 and identifiers with which exchanges took place, for example with an external computer 24. A configuration in which the battery 6 is used may appear in the transaction table, for example a V2G configuration. The energy table may be used to store data indicative of input and output powers, for example in the form of date and hour provided by a clock 54 of the battery management system 8, charging or discharging step, an amount of power measured by a measurement unit 56 of the battery management system 8, and a reference in the transaction table. A discharging of the battery 6 into the vehicle 2 during its operation constitutes for example a transaction. The event table may be used to collect changes of state of some sensors 34 and occurrences that derive from non-nominal performance sequence in the algorithms applied by the battery management system 8 as well as events spotted in the information produced by the vehicle management unit 10, for example an operation directed to charge the battery 6. An event may be linked to the transaction table, for example during an authentication of the user of the vehicle 2 or when the state of a relay 52 is read and does not match with the state in which it has been controlled. The transaction data stored in the memory 42 may comprise identification and configuration data of the devices detected by the device identification module 38 and depending on a state in which the vehicle 2 is (e.g. stopped, running, gun connected or not, etc.), time data associated to the transactions, and data indicative of the transaction types, in relation with the event data. The energy data stored in the memory 42 may comprise capacity, input and output power measurements and efficiency data of the battery 6 according to the information produced by the battery management system 8 and the technical characteristics of the battery 6, in relation with the transaction data.

The measurement unit 56 of the battery management system 8 may measure raw values of voltage, current, induction, impedance and temperature of the battery 6. The calculation unit 44 is configured to determine amounts forming the energy data as function of the raw values measured by the battery management system 8 during charging and discharging operations of the battery 6. The processing module 40 may have a processing mode to integrate a current value in the time domain in order to determine a total capacity (A·h) of a charging or discharging step, and compute variables such as the transited power (W), the energy (W·h), the efficiency (%), a number of total charging and discharging cycles of the battery 6 and evaluate the resistance of the cells 46 of the battery 6. This information may be part of the energy data stored in the memory 42. The processing module 40 may be configured to compute energy projections with the calculation unit 44 and store data resulting from the energy projections and forming reference data in the memory 42.

The battery management system 8 preferably has a protection circuit 58 configured to protect the battery 6 according to the technical characteristics of the battery 6 and the cells that compose it. Voltage, current, inductance, impedance and temperature signals of the battery 6, state signals of the protection relays 52 and control signals routed via the communication module 48 may be processed by the protection circuit 58. The protection circuit 58 may be configured to activate the relays 52 as those for electrical protection and generate the control signals. Some of the sensors 34 may be used to insure a protection of the physical integrity of the battery management system 8, the battery 6 and its box 4, while other ones may be used to detect and react to electrical and mechanical protection failures of the pack of cells 46 of the battery 6 and its box 4.

The memory 42 of the processing module 40 may be configured to store and manage identifiers of the cells 46 of the battery 6, the box 4 and the battery management system 8 forming a basic definition of the protected system, and to store identifiers of the integrated charger 18 if applicable, the vehicle management unit 10, the electric motor controller 16 and other devices connected to the bus 12 if desired. The monitoring module 36 may be configured to validate a match of the identifiers with the data formerly stored in the memory 42 of the processing module 40 and record an event code in case of a change or difference detected in the combination of the group formed of the battery management system 8, the box 4 and the battery 6 (and the other devices if desired) when one or several identifiers do not match with the expected identifiers, in order to report a possible integrity breach. The validation may be performed when switching on the battery management system 8 and on other occasions if desired. The identifiers of the cells 46, the box 4 and the battery management system 8 may be stored in the form of a file or another form if desired. The identifier of a cell 46 may consist of a bar code or an arbitrary identifier. The identifiers of the box 4 and the battery management system 8 are obtained from the chips 30, 32, the chip 30 being possibly inside the box 4, the chip 32 being possibly located on a printed circuit of the battery management system 8 where its processor 60 and its memory 62 are located. The identifier of the electric motor controller 16 is useful since a power transfer used to charge the battery 6 is possible from this equipment, i.e. regenerative braking. The file access is preferably read and write protected. A warning in case of an integrity breach may be transmitted to the vehicle management unit 10 or a remote computer 24 through the processor 60 of the battery management system 8 and the communication module 48.

The calculation unit 44 performs a computation of the input and output energy balance. At each filling up e.g. reported by the vehicle management unit 10 to the battery management system 8, the calculation unit 44 determines the energy balance by a relative calibration of the current, voltage and time measurements (Volt·Ampere·Hour) according to a reading obtained by the battery management system 8, and determines an imbalance state in the energy balance when a difference between the power input and power output values exceeds an predefined acceptable threshold. The calibration may also be made according to a reading of the station 22 when it is available. Beyond the threshold, in a possible configuration, the processing module 40 warns, through the processor 60 of the battery management system 8, the vehicle management unit 10 of a significant state of imbalance between the power input and the power output and may warn the next station 22 or another device connected to the connection element 20. An encrypted balance may be communicated to an external computer 24 or processor via the communication module 48. A procedure implemented for example in the communication module 48 may allow authenticating a balance transfer request. When a device is authenticated by means of the device identification module 38, an authentication information is dated and recorded in the transaction table. The communication module 48 may have a mode of clear transmission and a mode of encrypted transmission of the data stored in the memory 42 of the processing module 40 or in another source as the memory 62 of the battery management system 8, depending on whether the data have a public or private attribute based on conditions predefined by the authorities or those responsible for the system. For enhanced security, the attribute of all the data collected by the processing module 40, as the energy balance, should be private so that those data are transmitted in encrypted form.

The memory 62 of the battery management system 8 may be used to store history data indicative of a usage profile of the vehicle 2 and the battery 6. The communication module 48 may be configured to transmit the history data in response to a corresponding request received by the communication module 48, e.g. routed by the bus 12 or by a wireless link. The history data may have a public attribute so that the communication module 48 transmits them without encryption.

The integrity monitoring module 36, the device identification module 38, the information processing module 40 and the communication module 48 may be fully or partially integrated in the battery management system 8 depending on whether its hardware and functional capacities allow it, for example whether its programming can be changed. For example, the memories 42, 56 may be formed by a same shared memory, the calculation unit 44 may be embodied by the processor 62, etc. The modules 36, 38, 40, 48 may also take the form of separate or combined electric/electronic circuits coupled to the battery management system 8. The energy imbalance or breach in integrity warnings may trigger a sound signal or a "battery service" type of signal displayed on the dashboard 14 of the vehicle 14. The protected system may be provided with an accelerometer to validate the transactions with the electric motor, e.g. by simulating the possible input deriving from a regenerative braking. A typical power/acceleration profile may be computed for a series of actual transactions during operation of the vehicle 2 in order to validate the transactions of the regenerative braking. A deployment of air bags following an impact may be monitored so that measurements are taken to check if the battery 6 has been damaged and take actions accordingly such as deactivating a damaged cell 46 or changing its temperature.

While embodiments of the invention have been illustrated in the accompanying drawing and described above, it will be evident to those skilled in the art that modifications may be made therein without departing from the invention.

The invention claimed is:

1. A protected system for controlling power transactions for an electric vehicle provided with a box enclosing a battery, a battery management system, a vehicle management unit, and a bus between the vehicle management unit and the battery management system, the protected system comprising:
   identification modules respectively integrated to the box and the battery management system, providing identification information of the box and the battery management system;
   a set of integrity sensors of the box and of the battery having readable states;
   an integrity monitoring module connected to the integrity sensors, producing information indicative of the states of the integrity sensors;
   a device identification module for identification of devices connected to the bus;
   a processing module for processing device information produced by the battery management system, the vehicle management unit, the integrity monitoring module, the device identification module and other given devices when connected to the bus, the processing module having:
      a memory storing data indicative of technical characteristics of the battery, and event, transaction and energy data derived from selectively processing the device information as a function of the technical characteristics of the battery; and
      a calculation unit determining an energy balance as a function of the event, transaction and energy data; and
   a communication module having a mode of transmission of a warning in case of an imbalance in the energy balance and in case of an integrity breach revealed by the data stored in the memory of the processing module.

2. The protected system according to claim 1, wherein the identification modules comprise identification chips providing respective identifiers managed by the processing module in order to record an event code in the memory of the processing module in case of difference with an identifier formerly stored in the memory.

3. The protected system according to claim 1, wherein the event data stored in the memory of the processing module comprise event data spotted in the information produced by the vehicle management unit.

4. The protected system according to claim 1, wherein the transaction data stored in the memory of the processing module comprise identification and configuration data of devices detected by the device identification module and depending on a state in which the vehicle is in, time data associated with the transactions, and data indicative of transaction types, in relation to the event data stored.

5. The protected system according to claim 1, wherein the energy data stored in the memory of the processing module comprise battery capacity, input and output power measurement and efficiency data according to the information produced by the battery management system and the technical characteristics of the battery, in relation to the transaction data stored.

6. The protected system according to claim 5, wherein the battery management system measures raw voltage, current, induction, impedance and temperature values of the battery, and the calculation unit is configured to determine amounts forming the energy data as a function of the raw values measured by the battery management system during charging and discharging operations of the battery.

7. The protected system according to claim 5, wherein the energy data stored in the memory of the processing module further comprise data indicative of at least one of a transited power and a number of total charging and discharging cycles of the battery.

8. The protected system according to claim 5, wherein the technical characteristics of the battery comprise characteristics among a type of chemistry, a number of cells, a configuration of the cells, a nominal capacity of the battery, a nominal power, a voltage range, a maximum charge voltage of a cell, a minimum voltage of a cell, peak values of current in continuous and in power demand modes, a maximum rate of self-discharge per cell, a mode of equalization and charge and discharge temperature ranges.

9. The protected system according to claim 1, wherein the processing module is configured to compute energy projections with the calculation unit and store data resulting from the energy projections and to form reference data in the memory.

10. The protected system according to claim 1, wherein the communication module is connected to the bus and the mode of transmission of a warning includes a transmission of a state of imbalance in the energy balance and a transmission of corresponding data stored in the memory of the processing module in encrypted form on the bus in response to a corresponding request received by the communication module.

11. The protected system according to claim 1, wherein the electric vehicle is provided with an external connection element connected to the bus, and the devices that the device identification module manages comprise at least one of a charging station and a computer connected to the external connection element.

12. The protected system according to claim 1, wherein at least one of the integrity monitoring module, the device identification module, the information processing module and the communication module is integrated in the battery management system.

13. The protected system according to claim 1, wherein the communication module is connected to the bus and comprises a mode of clear transmission and a mode of encrypted transmission of the data stored in the memory of the processing module depending on whether the data have a public or private attribute based on predefined conditions.

14. The protected system according to claim 1, wherein the electric vehicle is also provided with relays for protection of the battery and electrical and mechanical protection failure sensors of the battery and the box, and the processing module is configured to store event data in case of a failure based on a state of the relays or a predefined signal produced by one of the failure sensors.

15. The protected system according to claim 1, wherein the electric vehicle is also provided with an electric motor controller connected to the bus, and the processing module is configured to manage information indicative of power exchange with the electric motor controller.

16. The protected system according to claim 1, wherein the device identification module has an identification mode for identifying a device connected to the bus by at least one of a MAC address, a GPS locating and an IP address.

17. The protected system according to claim 1, wherein the memory of the processing module is configured to store identifiers of cells of the battery, the box and the battery management system forming a basic definition of the protected system, to store identifiers of an integrated charger, the vehicle management unit and an electric motor controller.

18. The protected system according to claim 17, wherein the monitoring module is configured to validate a match of the identifiers with the data formerly stored in the memory of the processing module and record an event code in case of a detected change in order to warn of a possible breach in integrity.

19. The protected system according to claim 1, wherein the calculation unit is configured to determine the energy balance by a calibration of current, voltage and time measurements based on a reading obtained by the battery management system, and determine a state of imbalance in the energy balance when a difference between input and output power values exceeds a predefined threshold.

20. The protected system according to claim 1, wherein the battery management system comprises a memory storing history data indicative of a usage profile of the vehicle, and the communication module is configured to transmit the history data in response to a corresponding request received by the communication module.

* * * * *